United States Patent [19]

Schmit et al.

[11] Patent Number: 4,802,978

[45] Date of Patent: Feb. 7, 1989

[54] OIL-WATER SEPARATOR

[75] Inventors: Michael B. Schmit; Robert T. McTighe, both of Mitchell, S. Dak.

[73] Assignee: McTighe Industries, Inc., Mitchell, S. Dak.

[21] Appl. No.: 19,945

[22] Filed: Feb. 27, 1987

[51] Int. Cl.⁴ ............................................. B01D 17/028
[52] U.S. Cl. ..................................... 210/104; 210/519; 210/521; 210/540
[58] Field of Search ............... 210/104, 519, 521, 522, 210/532.1, 533, 535, 540, 744, 802

[56] References Cited

U.S. PATENT DOCUMENTS

| | | | |
|---|---|---|---|
| 349,990 | 9/1986 | Gaillet et al. | |
| 653,012 | 7/1900 | Koyl | |
| 2,104,050 | 1/1938 | Nibecker et al. | 210/51 |
| 2,942,733 | 6/1960 | Thompson | 210/540 |
| 3,396,846 | 8/1968 | Hamilton | 210/744 |
| 3,710,949 | 1/1973 | Murkes | 210/522 |
| 3,800,945 | 4/1974 | Fowler | 210/489 |
| 3,849,311 | 11/1974 | Jakubek | 210/521 |
| 3,884,815 | 5/1975 | Cornelissen | 210/521 |
| 3,963,624 | 6/1976 | Henderson et al. | 210/521 |
| 4,022,596 | 5/1977 | Pedersen | 210/499 |
| 4,042,512 | 8/1977 | McCarthy et al. | 210/521 |
| 4,067,813 | 1/1978 | Pielkenrood | 210/521 |
| 4,199,451 | 4/1980 | Hsiung et al. | 210/521 |
| 4,203,849 | 5/1980 | Ino et al. | 210/522 |
| 4,385,986 | 5/1983 | Jaisinghani et al. | 210/521 |

Primary Examiner—Benoit Castel
Assistant Examiner—Richard D. Jordan
Attorney, Agent, or Firm—Bacon & Thomas

[57] ABSTRACT

An oil water separator is disclosed having a vertical, cylindrical tank with a plurality of corrugated, oleophilic plates. A corrugated diffusion baffle is located adjacent an oil-water mixture inlet to remove the larger particulate material from the mixture and to cause coalescing of the larger oil droplets. The flow of the oil-water mixture proceeds generally in a vertical direction and passes between the corrugated plates to cause further coalescing of the oil droplets. A separate oil channel directs the coalesced oil to an upper portion of the tank. The clarified water then passes downwardly to a clean water outlet. A second coalescing unit may be located upstream of the clean water outlet to further coalesce and remove the smaller oil droplets. In this case, a second oil relief channel directs these coalesced oil particles to the upper portion of the tank, from which the oil may be removed.

22 Claims, 2 Drawing Sheets

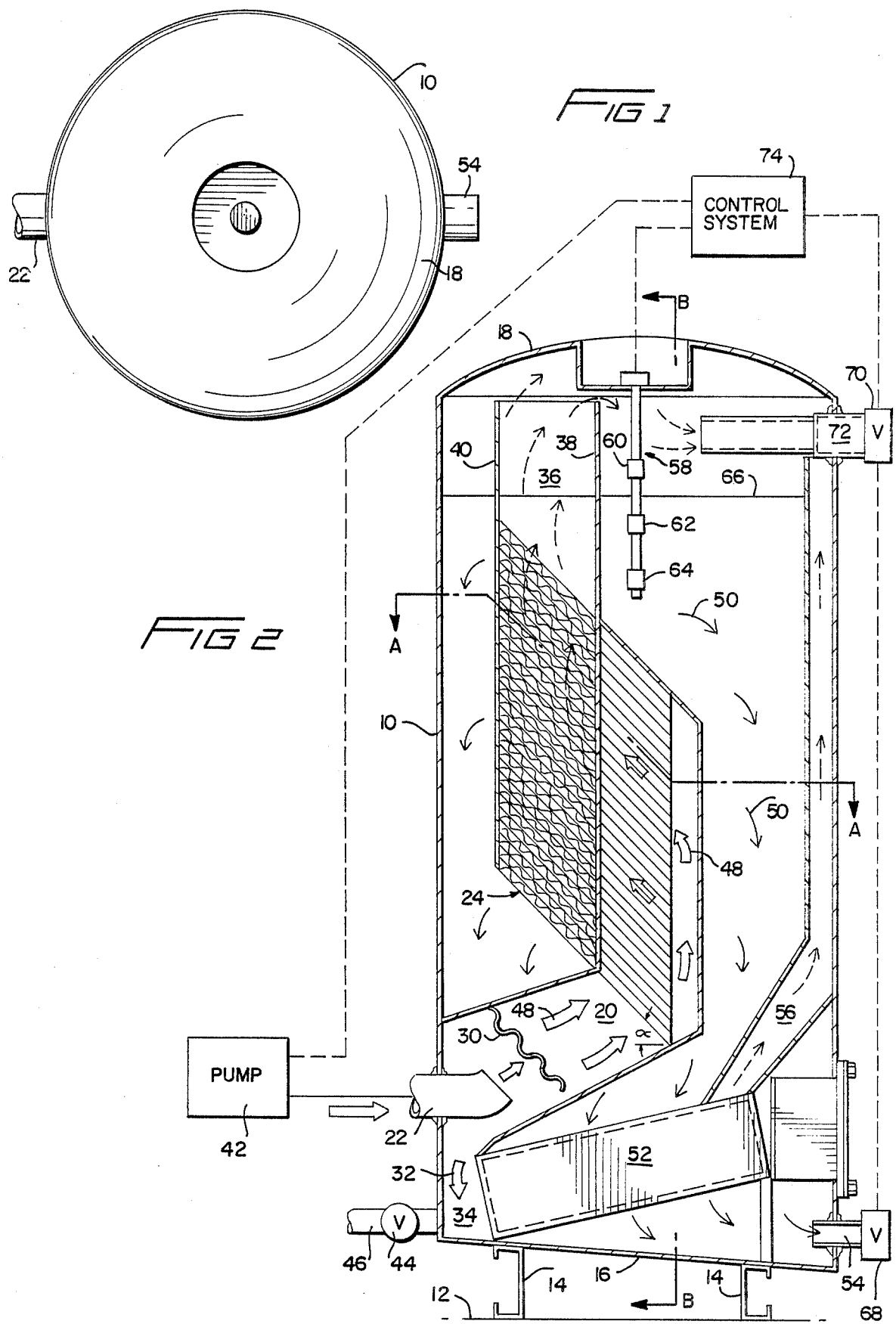

OIL-WATER SEPARATOR

BACKGROUND OF THE INVENTION

This invention relates to a device for separating an oil-water mixture, particularly such a device for use on board a ship to purify the oil-water mixture found in ship bilges.

Many devices have been developed over the years to remove oil or the like from water. Such devices typically incorporates a plurality of plates arranged parallel to each other so that the contaminated water may pass between the plates from one and to the other. Such passage causes the oil droplets within the water to coalesce and, after the mixture passes over the plates, to rise to the top of the device. The water may then be withdrawn and the oil may be separately withdrawn for further treatment or disposal.

It is also known to form the parallel plates with a corrugated surface to facilitate the removal of the oil droplets and to increase their coalescing ability.

Shipboard oil-water separators are also known to separate or remove the oil from the water found in the ship bilge. However, these systems have been generally very complex arrangements, and their complexity inherently reduces their overall reliability in service. Also, the typical corrugated, parallel plate separators have generally relied upon a stationary orientation to effectively separate the oil from the water, thereby rendering them unfit for shipboard use. The rolling motion of the ship generally decreases the efficiency of such known separators.

SUMMARY OF THE INVENTION

The instant invention provides a parallel plate type oil-water separator for shipboard use which effectively separates the oil from the water taken from the ship's bilge.

The system incorporating the oil-water separator according to the invention comprises a last in, last out, low pressure forced flow type oil-water separator which utilizes a plurality of parallel plates with corrugated surfaces. In order to decrease the size of the oil-water separator thereby rendering it fit for shipboard usage, and to increase the efficiency of the device, the oil-water separator according to this invention utilizes a generally vertical fluid flow within a vertically oriented, generally cylindrical tank.

The oil-water mixture first passes over a corrugated diffusion baffle located adjacent the tank inlet so as to coalesce the larger oil droplets and to remove the larger sludge particles. The oil-water mixture then passes through a plurality of spaced, parallel plates which are transversely corrugated. The plates are oriented such that adjacent sides are at angles of approximately 45° and 16° to a horizontal plane. This provides enhanced oil relief by directing the oil droplets forming on the corrugations to one side of each of the plates. The oil, being lighter than the water, coalesces on the underside of the corrugations and rises to the highest point of the plates. Once the oil arrives at the side of the plates, it passes into an oil relief channel which directs it to an upper portion of the tank.

The water, after passing over the plates, passes downwardly and may be withdrawn from an outlet located in the lower portion of the tank.

A secondary coalescer may be utilized adjacent the water outlet to further remove any of these smaller droplets of oil which may remain in the water. The secondary coalescer may comprise a filter media which causes the small oil droplets to coalesce. The secondary coalescer is also provided with enhanced oil relief such that the oil droplets pass into a second oil relief channel to direct the separated oil to the upper portion of the tank.

The oil outlet and the water outlet have valves located therein and are connected to a control system which controls their operation based upon the vertical position of the oil-water interface. Sensing devices are incorporated in the tank to automatically open and/or close the valves depending upon the position of the oil-water interface.

The oil-water separator according to this invention has essentially no moving parts and is capable of effectively separating the oil from the water for extended periods of time with substantially no supervision.

BRIEF DESCRIPTION OF THE DRAWINGS

FIG. 1 is a top plan view of the oil-water separator according to the invention.

FIG. 2 is a vertical cross-sectional view of the oil-water separator according to the invention.

DETAILED DESCRIPTION OF THE PREFERRED EMBODIMENT

Figure 3:
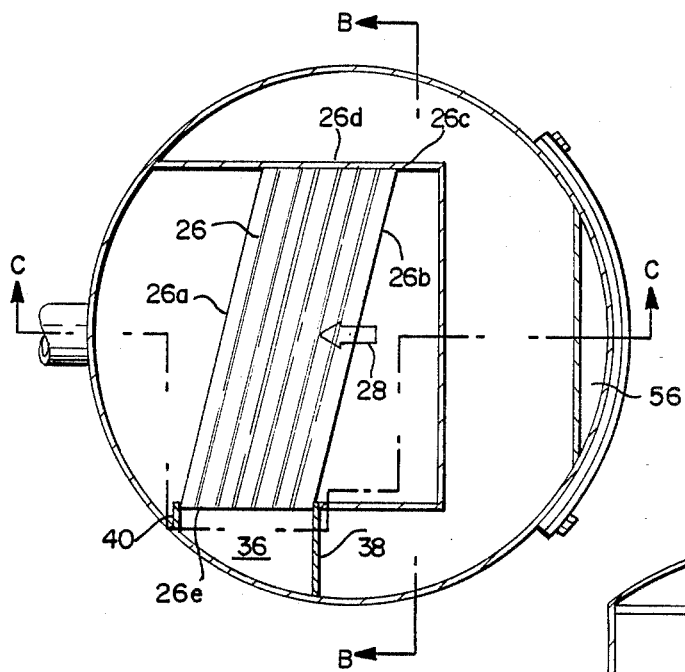
FIG. 3 is a sectional view of the oil-water separator taken along line A—A in FIG. 2.

The oil-water separator according to the invention comprises a generally vertically oriented, cylindrical tank 10 attached to a generally horizontal support surface 12 via mounting brackets 14 or the like. The axis of symmetry of cylindrical tank 10 extends generally perpendicular to the support surface 12. Tank 10 is fully enclosed by bottom 16 and top 18.

Figure 4:
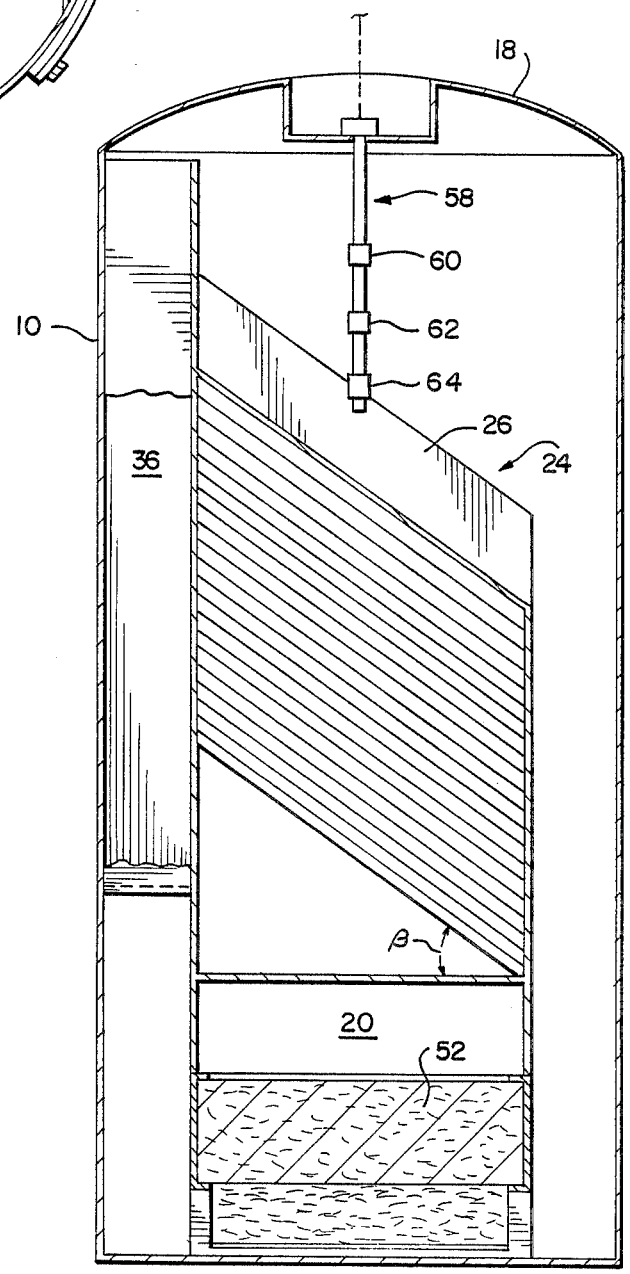
FIG. 4 is a cross-sectional view taken along B—B in FIG. 3.

Internal walls define an oil-water inlet channel 20 which directs the oil-water mixture from inlet pipe 22 over the plate pack 24. Plate pack 24 comprises a plurality of corrugated plates 26, each plate 26 having a generally rhomboid shape as best seen in FIG. 3. The plates 26 are substantially planar and have the corrugations formed in their major surfaces. The corrugations extend substantially parallel to sides first sides 26b and third sides 26a of the plates such that they extend at an angle of between 65° and 70° to the direction of the oil-water flow indicated by arrow 28 in FIG. 3. Each of the plates has a corner 26c and is oriented within the tank 10 such that adjacent first sides 26b and second sides 26d extending from corner 26c both form acute angles with a generally horizontal plane passing through the corner 26c. It is envisioned that these acute angles will be on the order of 45° and 16°, however, other angles may be appropriate for other operational parameters. Thus, angle alpha, shown in FIG. 2, and angle $\beta$, shown in FIG. 4 form acute angles of approximately 45° and 16° respectively. Although these angles have proven successful, it is to be understood that other angles may be utilized without exceeding the scope of this invention.

The plates may be formed of any sufficiently rigid material, although such material should obviously be chosen to minimize the corrosion caused by substantially constant contact with the oil-water mixture. The plates have successfully been formed of a fiberglass material, galvanized steel coated with a corrosion resistant coating and uncoated stainless steel.

A diffusion baffle 30 also having a corrugated surface, is disposed at an angle of approximately 33° from the vertical across the inlet channel 20 adjacent to inlet pipe 22. The diffusion baffle 30 causes the larger oil globules and the particulate material in the oil-water mixture to separate therefrom with the heavier particles falling in the direction of arrow 32 into sludge compartment 34.

An oil relief channel 36 is defined by walls 38, 40 and a portion of the tank wall 10. The channel is in communication with the highest, fourth side 26e of each of the plates 26 such that oil droplets coalescing in the corrugations formed in each of the plates 26 rises to the highest portion of each plate and passes into the relief channel 36.

In operation, the separator is initially filled with water, any air within the tank being forced through an air vent (not shown). In order to place the oil-water separator in operation, pump 42 forces the oil-water mixture into inlet passage 20 through inlet 22. The initial contact between the diffusion baffle 30 and the oil-water mixture causes the larger oil droplets to coalesce and also serves to remove the particulate material from the mixture. As noted previously, the particulate material falls into sludge compartment 34 from which it may be later removed by opening valve 44 and attaching any known sludge removal means to sludge outlet 46. The oil-water mixture flows in a generally vertically upwardly path indicated by arrows 48 in FIG. 2. The mixture is directed into plate pack 24 such that it passes through the spaces between the plates 26. The orientation of the baffle plates and their corrugations causes the oil droplets to coalesce on the underside of the corrugations and, since oil is lighter than water, the coalesced oil will rise along the bottom of the plates to the highest point of the plates.

The separated oil, upon reaching the highest point of the plates 26 passes into the oil relief channel 36 and rises to the upper portion of tank 20.

The water, after passing over the plates 26 exits plate pack 24 and is turned approximately 180° and flows generally downwardly as indicated by arrows 50.

A secondary coalescing unit 52 may also be incorporated into the oil-water separator according to this invention upstream of clean water outlet 54. The secondary coalescing unit may comprise an oleophilic filtering material such as that shown in U.S. Pat. No. 4,022,596. This material causes the smaller oil droplets to coalesce, and once again rise to the highest point of the secondary coalescing unit 52. A second oil relief channel 56 allows the coalesced oil to rise to the upper portion of the tank 10 after having passed through the secondary coalescing unit. The clarified water may be withdrawn through clean water outlet 54.

It is also possible to utilize the oil-water separator according to this invention without the secondary coalescing unit. In that case, the water would pass directly downwardly in direction of arrows 50 and through the clean water outlet 54.

A sensing system may also be incorporated into the oil-water separator to automatically control the operation in dependence upon the level of the oil-water interface. The sensing means 58 extends downwardly from the upper portion of tank 10 and incorporates a series of control floats 60, 62 and 64. The oil water interface is illustrated in FIG. 2 at 66 as being between upper float 60 and lower float 62. As long as the water surrounds the lower float 62, water effluent valve 68 remains open. Thus, if the oil-water interface 66 is above float 62, valve 68 will be open.

When the oil builds down to a level below upper float 60, as indicated in FIG. 1, oil effluent valve 70 will also be opened. If the oil-water interface 66 rises above upper float 60, oil effluent valve 70 will automatically close to prevent water from exiting the oil outlet 72.

Should the oil-water interface 66 drop below float 64, the control system 74 will automatically close water effluent valve 68 and will also shut down the operation of pump 42 to prevent the input of any further oil-water mixture. It is also possible to interconnect the control system with an alarm to indicate to the proper personnel that the system has been shut down.

The foregoing description as provided for illustrative purposes and should not be construed as in any way limiting this invention, the scope of which is defined solely by the appended claims.

What is claimed:

1. An oil-water separator comprising:
   (a) a tank;
   (b) inlet means located in a lower portion of the tank and defining a flow path to direct an oil-water mixture into the tank;
   (c) diffusion baffle means in the inlet means, the diffusion baffle having a corrugated surface;
   (d) a coalescing pack comprising a plurality of substantially parallel generally planar oleophilic plates, each plate having a generally polygonal shape with a corner and being oriented such that first and second sides of each plate extending from the corner form acute angles with a generally horizontal plane passing through the corner, the plate pack located within the tank above the inlet means such that the oil-water mixture flows across the plates from the first side toward an opposite, third side through the plate pack between the plates causing the oil particles to separate from the water and to coalesce on the underside of the plates;
   (e) a plurality of substantially parallel corrugations formed on major surfaces of each plate extending generally transverse to the flow of oil-water mixture across the plates such that oil particles coalescing on the underside of each plate are directed to a fourth side of each plate;
   (f) means defining an oil relief channel in fluid communication with the fourth sides of the plates in the pack to direct the separated oil into an upper portion of the tank separate from the oil-water mixture flowing across the plates;
   (g) a clean water outlet;
   (h) water channel means to direct water from the plate pack to the clean water outlet; and
   (i) oil outlet means located in the upper portion of the tank to facilitate withdrawal of the separated oil therefrom.

2. The oil-water separation according to claim 1 wherein the tank has a generally cylindrical configuration oriented such that an axis of symmetry extends in a generally vertical direction.

3. The oil-water separator according to claim 2 wherein the first side extends at an angle of approximately 16° and the second side extends at an angle of approximately 45° to the horizontal plane.

4. The oil-water separator according to claim 3 wherein each of the oleophilic plates has a substantially rhomboid shape.

5. The oil-water separator according to claim 4 wherein the corrugations extend generally parallel to the first and third sides.

6. The oil-water separator according to claim 5 wherein each of the corrugations on the major surfaces of the oleophilic extend at an angle of between 65° and 70° to the direction of the oil-water flow over the plates.

7. The oil-water separator according to claim 6 further comprising:
(a) an oil effluent valve to control the flow of oil through the oil outlet means; and,
(b) a water effluent valve to control the flow of water through the clean water outlet.

8. The oil-water separator according to claim 7 further comprising:
(a) first and second sensing means to sense first and second levels of the oil-water interface; and,
(b) control means interconnecting the first and second sensing means with the oil effluent valve and the water effluent valve such that when the interface is above the first level the water effluent valve is open and the oil effluent valve is closed; when the interface is between the first level and a lower, second level both oil and water effluent valves are open; and when the interface is below the second level, the oil effluent valve is open and the water effluent valve is closed.

9. The oil-water separator according to claim 8 further comprising: third sensing means to sense a third level of the oil-water interface below the second level and wherein the control means includes means to close both the oil and water effluent valves when the oil-water interface reaches the third level below the second predetermined level.

10. The oil-water separator according to claim 9 further comprising pump means to pump the oil-water mixture into the tank and wherein the control means also shuts off the pump means when the oil-water reaches the third predetermined level.

11. The oil water separator according to claim 10 further comprising a second coalescing unit located within the tank in the water channel means upstream of the clean water outlet to coalesce oil droplets remaining in the water.

12. The oil water separator according to claim 11 further comprising second oil relief channel means in fluid communication with the second coalescing unit so as to direct oil removed by the second coalescing unit to an upper portion of the tank.

13. The oil water separator according to claim 1 further comprising a second coalescing unit located within the tank in the water channel means upstream of the clean water outlet to coalesce oil droplets remaining in the water.

14. The oil-water separator according to claim 13 further comprising means defining a second oil relief channel separated from the water flow and in fluid communication with the second coalescing unit so as to direct oil removed by the second coalescing unit to an upper portion of the tank.

15. The oil-water separator according to claim 1 wherein the first side extends at an angle of approximately 16° and the second side extends at an angle of approximately 45° to the horizontal plane.

16. The oil-water separator according to claim 1 wherein each of the oleophilic plates has a substantially rhomboid shape.

17. The oil-water separator according to claim 16 wherein the corrugations extend generally parallel to the first and third sides.

18. The oil-water separator according to claim 1 wherein each of the corrugations on the major surfaces of the oleophilic plates extend at an angle of between 65° and 70° to the direction of the oil-water flow over the plates.

19. The oil-water separator according to claim 1 further comprising:
(a) an oil effluent valve to control the flow of oil through the oil outlet means; and,
(b) a water effluent valve to control the flow of water through the clean water outlet.

20. The oil-water separator according to claim 19 further comprising:
(a) first and second sensing means to sense first and second levels of the oil-water interface; and,
(b) control means interconnecting the first and second sensing means with the oil effluent valve and the water effluent valve such that when the interface is above the first level the water effluent valve is open and the oil effluent valve is closed; when the interface is between the first level and a lower, second level both oil and water effluent valves are open; and when the interface is below the second level, the oil effluent valve is open and the water effluent valve is closed.

21. The oil-water separator according to claim 20 further comprising: third sensing means to sense a third level of the oil-water interface below the second level and wherein the control means includes means to close both the oil and water effluent valves when the oil-water interface reaches the third level below the second predetermined level.

22. The oil-water separator according to claim 21 further comprising pump means to pump the oil-water mixture into the tank and wherein the control means also shuts off the pump means when the oil-water reaches the third predetermined level.

* * * * *